United States Patent
Philpott

(10) Patent No.: US 9,618,067 B2
(45) Date of Patent: *Apr. 11, 2017

(54) BRAKE ASSEMBLY AND METHOD OF CONTROL

(71) Applicant: ArvinMeritor Technology, LLC, Troy, MI (US)

(72) Inventor: Daniel Philpott, Oxford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/564,139

(22) Filed: Dec. 9, 2014

(65) Prior Publication Data

US 2016/0160949 A1 Jun. 9, 2016

(51) Int. Cl.
*F16D 55/02* (2006.01)
*F16D 65/66* (2006.01)
(Continued)

(52) U.S. Cl.
CPC ........... *F16D 65/66* (2013.01); *F16D 55/225* (2013.01); *F16D 55/2265* (2013.01); *F16D 65/0068* (2013.01); *F16D 65/18* (2013.01); *F16D 65/183* (2013.01); *F16D 65/38* (2013.01); *F16D 65/568* (2013.01); *F16D 66/021* (2013.01); *F16D 66/025* (2013.01); *F16D 66/026* (2013.01); *F16D 66/027* (2013.01); *F16D 66/028* (2013.01); *F16D 2055/0016* (2013.01);
(Continued)

(58) Field of Classification Search
CPC ................. F16D 55/225; F16D 55/227; F16D 55/22655; F16D 65/008; F16D 65/18; F16D 66/021; F16D 66/02; F16D 66/027; F16D 2121/22; F16D 2055/0016; F16D 65/66; F16D 65/183; F16D 65/38; F16D 65/568; F16D 66/025; F16D 66/026; F16D 2066/003; F16D 2121/14; F16D 2125/40; F16D 2125/60; B60T 1/065; B60T 17/22
USPC ........ 188/71.9, 72.8, 1.11 L, 1.11 E, 1.11 W, 188/196 R, 202

See application file for complete search history.

(56) References Cited

U.S. PATENT DOCUMENTS

| 5,087,907 A | 2/1992 | Weiler et al. |
| 5,632,359 A | 5/1997 | Camps et al. |

(Continued)

FOREIGN PATENT DOCUMENTS

| DE | 4213581 C1 | 5/1993 |
| EP | 1892435 A1 | 2/2008 |
| GB | 2310015 A | 8/1997 |

OTHER PUBLICATIONS

MGM Brakes Electronic Air Disc Brake Stroke Technical Manual Index, Overview, and Specifications, date unknown, EB 08-001, rev. 02, MGM Brakes, Charlotte, North Carolina, U.S.A.
(Continued)

*Primary Examiner* — Pamela Rodriguez
(74) *Attorney, Agent, or Firm* — Brooks Kushman P.C.

(57) ABSTRACT

A brake assembly that may include a housing assembly, a piston assembly, an operating shaft, and a sensor assembly. The operating shaft may be configured to rotate about an axis to actuate the piston assembly and translate a brake pad assembly from a retracted position to an extended position. The sensor assembly may be configured to detect rotation of the operating shaft.

11 Claims, 6 Drawing Sheets

(51) Int. Cl.
*F16D 55/225* (2006.01)
*F16D 65/00* (2006.01)
*F16D 65/18* (2006.01)
*F16D 55/2265* (2006.01)
*F16D 65/38* (2006.01)
*F16D 65/56* (2006.01)
*F16D 66/02* (2006.01)
*F16D 55/00* (2006.01)
*F16D 125/40* (2012.01)
*F16D 125/06* (2012.01)
*F16D 66/00* (2006.01)
*F16D 121/14* (2012.01)
*F16D 125/32* (2012.01)

(52) U.S. Cl.
CPC .... *F16D 2066/003* (2013.01); *F16D 2121/14* (2013.01); *F16D 2125/06* (2013.01); *F16D 2125/32* (2013.01); *F16D 2125/40* (2013.01)

(56) References Cited

U.S. PATENT DOCUMENTS

| | | |
|---|---|---|
| 6,272,914 B1 | 8/2001 | Ciotti |
| 6,637,262 B2 | 10/2003 | Chang et al. |
| 7,175,006 B2 | 2/2007 | Plantan et al. |
| 8,047,336 B2 | 11/2011 | Niehorster et al. |
| 9,279,468 B1* | 3/2016 | Philpott ............... F16D 66/021 |
| 2005/0039988 A1 | 2/2005 | Philpott |
| 2006/0090968 A1 | 5/2006 | Taylor et al. |
| 2009/0177362 A1 | 7/2009 | Schmitt et al. |

OTHER PUBLICATIONS

Brake Assembly, inventor: Daniel Philpott, U.S. Appl. No. 14/564,176, filed Dec. 9, 2014.
European Patent Office, Extended European Search Report for the corresponding European Patent Application No. 15193559.0 dated May 18, 2016.

\* cited by examiner

BRAKE ASSEMBLY AND METHOD OF CONTROL

TECHNICAL FIELD

This patent application relates to a brake assembly and a method of control.

BACKGROUND

An apparatus and method for sensing disc brake actuator position is disclosed in U.S. Pat. No. 7,175,006.

SUMMARY

In at least one embodiment, a brake assembly is provided. The brake assembly may include a housing assembly, a piston assembly, an operating shaft, and a sensor assembly. The piston assembly may be moveably disposed within the housing assembly. The operating shaft may have a position feature and may be disposed proximate the housing assembly. The operating shaft may rotate about an operating shaft axis to actuate the piston assembly and translate a brake pad assembly from a retracted position to an extended position. The sensor assembly may be disposed proximate the operating shaft and may be configured to detect rotation of the operating shaft by detecting a position of the position feature.

In at least one embodiment, a brake assembly is provided. The brake assembly may include a housing assembly, an operating shaft, an adjuster mechanism, and a sensor assembly. The housing assembly may be provided with a piston assembly. The operating shaft may have a position feature and may be disposed proximate the housing assembly. The operating shaft may be configured to rotate about an operating shaft axis to actuate the piston assembly and translate a brake pad assembly from a retracted position to an extended position. The adjuster mechanism may be operatively coupled to the piston assembly and may be configured to change the extended position in response to rotation of the operating shaft. The sensor assembly may be disposed proximate the operating shaft and may be configured to detect the position feature and a change in the extended position.

In at least one embodiment, a method of controlling a brake assembly is provided. The method may include actuating a brake pad assembly and detecting rotation of an operating shaft with a sensor assembly. The operating shaft may be configured to rotate about an operating shaft axis to actuate a piston assembly that may actuate the brake pad assembly from a retracted position in which the brake pad assembly may not engage a rotor to an extended position in which the brake pad assembly may engage the rotor. The sensor assembly may provide a signal indicative of rotation of the operating shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
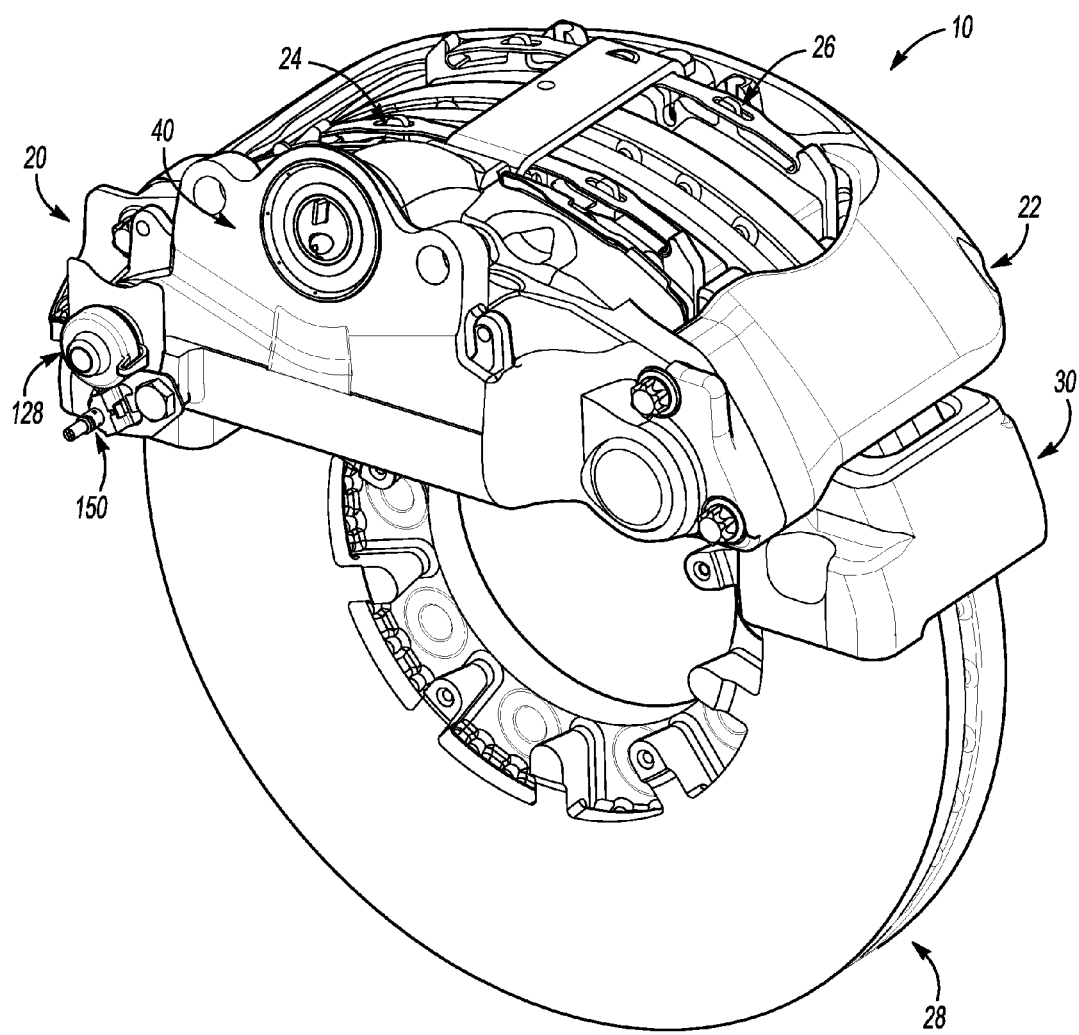
FIG. 1 is a perspective view of a brake assembly.
Figure 2A:
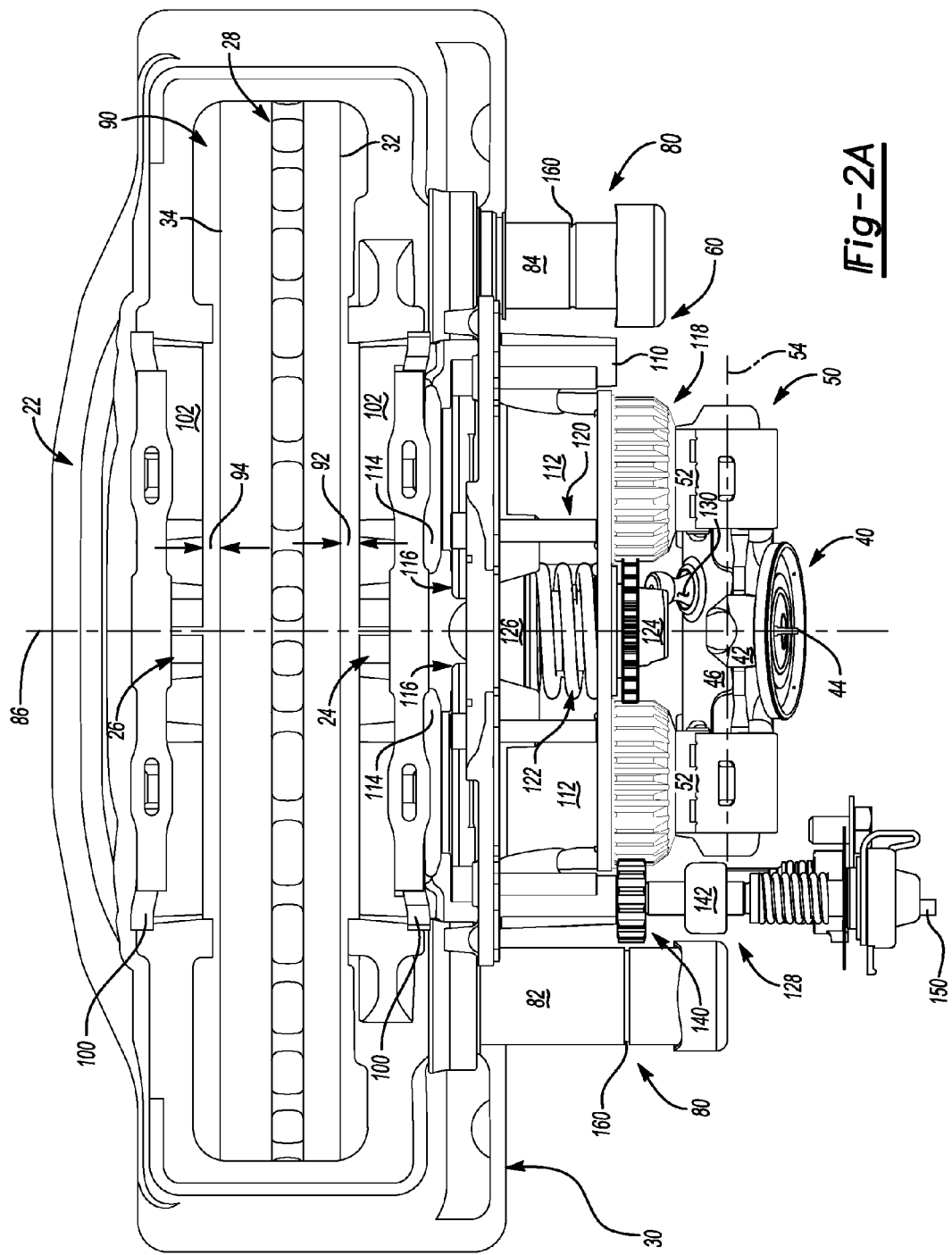
FIG. 2a is a top view of the brake assembly with brake pad assemblies in exemplary retracted positions.
Figure 2B:
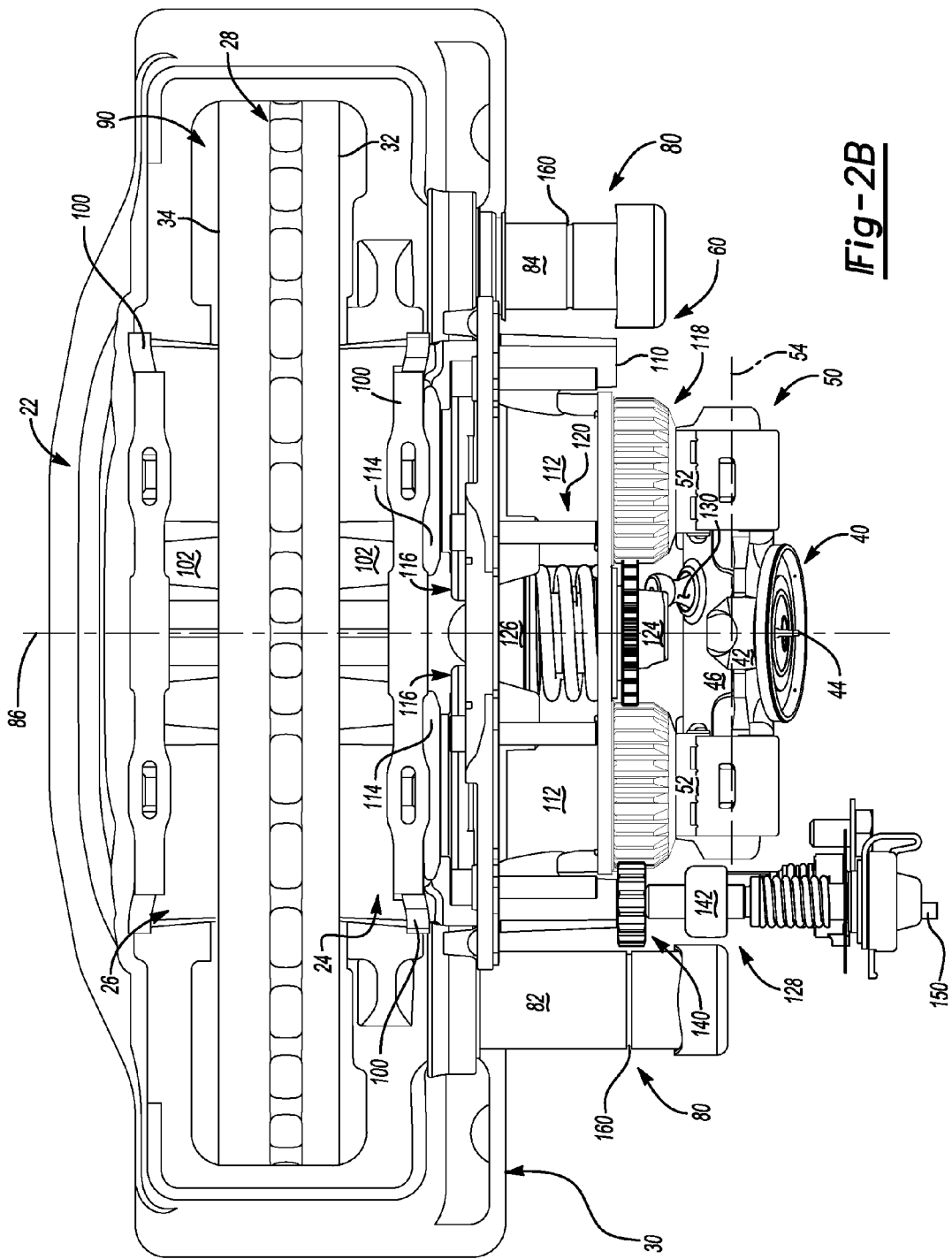
FIG. 2b is a top view of the brake assembly with brake pad assemblies in exemplary extended positions.

Referring to FIGS. 1, 2a, and 2b, a brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In at least one embodiment, the brake assembly 10 may include a housing assembly 20, a caliper bridge 22, a first brake pad assembly 24, a second brake pad assembly 26, a rotor 28, and a carrier 30.

The housing assembly 20 may receive and position various components of the brake assembly 10. For example, the housing assembly 20 may facilitate mounting of an actuator 40. The actuator 40 may be of any suitable type, such as a pneumatic, electrical, or electromechanical actuator. The actuator 40 may be operatively connected to an actuating lever 42.

The actuating lever 42 may perform an angular reciprocal swinging movement in response to the action of a thrust member 44 of the actuator 40 to apply the brakes or actuate the first brake assembly 24 and the second brake pad assembly 26. The actuating lever 42 may be disposed proximate or may be attached to a rotary actuating member 46 that together may at least partially define an operating shaft 50 that may be rotatably supported within the housing assembly 20. The operating shaft 50 may be configured to rotate about an operating shaft axis 54.

The operating shaft 50 may be rotatably disposed in the housing assembly 20. For example, the operating shaft 50 may be disposed on rollers 52. The rollers 52 may extend along and may rotate about a roller axis that may extend substantially parallel to and may be offset from the operating shaft axis 54 to form an eccentric actuating arrangement. The rollers 52 may bear against a piston assembly 60 that may be moveably or slidably disposed on the housing assembly 20. The first brake pad assembly 24 or the second brake pad assembly 26 may be disposed proximate the piston assembly 60 and may be actuated by the piston assembly 60.

Figure 3:
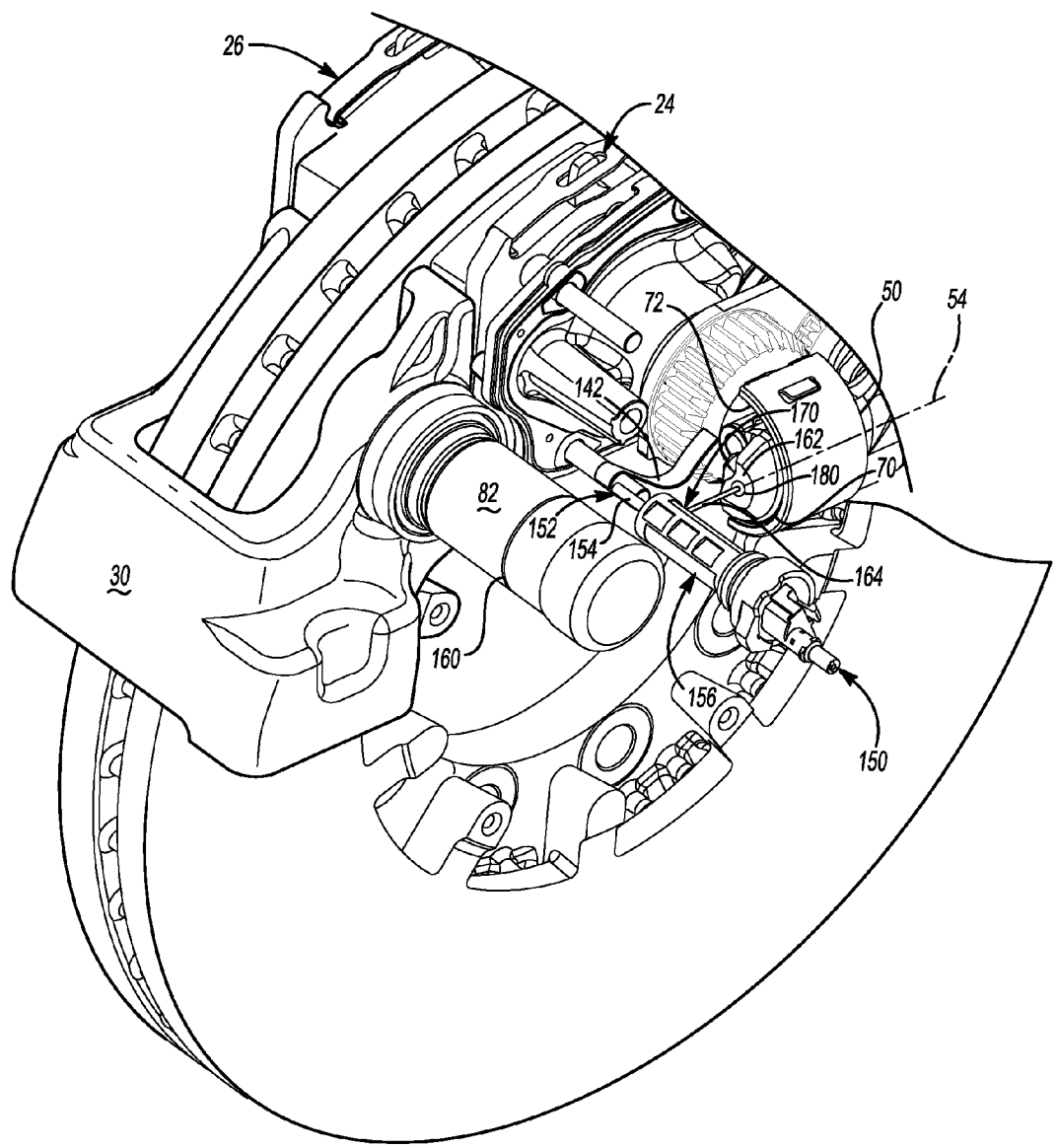
FIG. 3 is a fragmentary perspective view of the brake assembly with a wear adjuster omitted for clarity.

Referring to FIG. 3, the operating shaft 50 may be provided with a cam profile or cam surface 70 that may engage a bearing surface 72. The operating shaft axis 54 may move toward the rollers 52 when the operating shaft 50 rotates in response to extending the actuator 40. The rotational motion of the operating shaft 50 and the rollers 52 may actuate the piston assembly 60 to translate the first brake pad assembly 24 from a first retracted position to a first extended position or an applied position. Further angular rotation of the operating shaft 50 may ultimately result in translation of the second brake pad assembly 26 from a second retracted position to a second extended position or an applied position as will be discussed in more detail below.

Referring to FIGS. 1, 2a and 2b, the caliper bridge 22 may be integrally formed with or may be fixedly disposed on the housing assembly 20. For example, the caliper bridge 22 may be coupled to the housing assembly 20 with one or more fasteners, such as a bolt. The caliper bridge 22 may cooperate with the housing assembly 20 to at least partially define an opening. In at least one embodiment, the first and second brake pad assembly 24, 26, may be at least partially disposed in the opening.

The housing assembly 20 and the caliper bridge 22 may be movably disposed on the carrier 30. For example, the housing assembly 20 may be slidably disposed on the slide pin assembly 80. The slide pin assembly 80 may be fixedly disposed on the carrier 30 and may interconnect or extend between the caliper bridge 22 and the housing assembly 20. One or more slide pin assemblies 80 may be provided. In FIG. 2a, two slide pin assemblies 80 are shown that each have a corresponding slide pin 82, 84. The slide pin assembly 80 may act as a locating feature to locate the housing assembly 20 relative to the carrier 30 and/or caliper bridge 22.

The caliper bridge 22 may be fixed to the housing assembly 20 and may cooperate to reactively translate the second brake pad assembly 26 toward the second side 34 of the rotor 28 after the first brake pad assembly 24 engages the first side 32 of the rotor 28. The housing assembly 20 and the caliper bridge 22 may slide together on slide pins 82, 84.

The carrier 30 may facilitate positioning of the first brake pad assembly 24 and the second brake pad assembly 26 with respect to the rotor 28 to facilitate braking of the vehicle or a vehicle wheel. The rotor 28 may also be referred to as a brake disc.

The carrier 30 may be fixedly mounted to the vehicle. For example, the carrier 30 may be connected to an axle or steering knuckle via an intermediate component, such as a torque plate, in one or more embodiments. The carrier 30 may receive and/or support the first and second brake pad assemblies 24, 26 and may include an opening 90 that may be configured to receive at least a portion of the rotor 28.

The carrier 30 may straddle and may be spaced apart from the rotor 28. The carrier 30 may position the first and second brake pad assemblies 24, 26 on opposite sides of the rotor 28. The first brake pad assembly 24 may be disposed proximate an inboard side or first side 32 of the rotor 28. The second pad assembly 26 may be disposed proximate an outboard side or second side 34 of the rotor 28.

The carrier 30 may help maintain a first adjustable predetermined gap or first running clearance 92 between the first brake pad assembly 24 and the first side 32 of the rotor 28. The carrier 30 may also help maintain a second adjustable predetermined gap or second running clearance 94 between the second brake pad assembly 26 and the second side 34 of the rotor 28. The first running clearance 92 may be determined or measured when the first brake pad assembly 24 is in the first retracted position. The second running clearance 94 may be determined or measured when the second brake pad assembly 26 is in the second retracted position.

The first retracted position and the second retracted position of the first and second brake pad assemblies 24, 26 may refer to the initial positions of the first brake pad assembly 24 and the second brake pad assembly 26, respectively, relative to the rotor 28 prior to actuation as shown in FIG. 2a. The first running clearance 92 may define a first actuation distance of the first brake pad assembly 24 from the first retracted position to the first extended position in which the first brake pad assembly 24 may engage the first side 32 of the rotor 28. The second running clearance 94 may define a second actuation distance of the second brake pad assembly 26 from the second retracted position to the second extended position in which the second brake pad assembly 26 may engage the second side 34 of the rotor 28.

The engagement of the first and second brake pad assemblies 24, 26 with the first and second sides 32, 34 of the rotor 28, respectively, may provide a clamping force that may retard rotation or the rotary motion of the rotor 28 about a rotor axis. Retarding rotary motion of the rotor 28 may slow or stop rotation of an associated vehicle wheel.

In at least one embodiment, the first and second brake pad assemblies 24, 26 may have similar or identical configurations. The first and second brake pad assemblies 24, 26 may each include a backing plate 100 and a friction material 102.

The backing plate 100 may be a structural member of a brake pad assembly 24, 26. The backing plate 100 may be made of any suitable material, such as a metal or metal alloy. As the first and second brake pad assemblies 24, 26 are actuated, the piston assembly 60 may engage or exert force on a surface of the backing plate 100 disposed opposite the friction material 102.

The friction material 102 may be fixedly disposed on a surface of the backing plate 100. The friction material 102 may face toward and be spaced apart from the rotor 28 when the first and second brake pad assemblies 24, 26 are in their first and second retracted positions prior to actuation. The friction material 102 may engage the rotor 28 during vehicle braking, such as when the first and second brake pad assemblies 24, 26 are actuated to the first and second extended positions, respectively.

The piston assembly 60 may actuate the first brake pad assembly 24 into engagement with the rotor 28 and may indirectly actuate the second brake pad assembly 26 into engagement with the rotor 28. For example, the piston assembly 60 may translate the first brake pad assembly 24 toward the first side 32 of the rotor 28 such that the first brake pad assembly 24 may engage the first side 32 of the rotor 28. In reaction to the engagement of the first brake pad assembly 24 with the first side 32 of the rotor 28, the housing assembly 20 may then translate via the caliper bridge 22 and slide pin assembly 80 to actuate the second brake pad assembly 26 into engagement with the second side 34 of the rotor 28.

The piston assembly 60 may include a piston housing 110, a piston 112, a piston head 114, a bushing 116, and a tappet 118. The piston housing 110 may be disposed proximate the housing assembly 20 and the caliper bridge 22. The piston housing 110 may act as a guide member for various piston assembly components. The piston housing 110 may include a guide located on either side of an aperture of the piston housing 110 that may receive the piston assembly 60. The piston housing 110 may move in unison with the piston assembly 60 during brake application and release; however, it is also contemplated that the piston housing 110 and piston assembly 60 may move relative to each other during brake application and release. The piston assembly 60 is shown as having a dual piston configuration; however, a greater or lesser number of pistons may be provided.

The piston head 114 may be disposed on an end portion of the piston 112 and may have a trilobular external surface that may be received within the bushing 116 such that the piston 112 may be axially guided by the bushing 116. The piston 112 may be provided with a threaded internal bore that may be arranged to receive the tappet 118 having a corresponding external thread.

The piston assembly 60 may slide along the slide pins 82, 84 when force is applied by the actuator 40 to rotate the operating shaft 50. Braking force may be transmitted via the piston head 114 to the first brake pad assembly 24. The piston housing 110 may move along or substantially parallel to an axis 86 toward the rotor 28 together with the piston assembly 60 during brake application. This movement of the piston housing 110 and piston assembly 60 may translate the first brake pad assembly 24 from the first retracted position towards the first extended position and may ultimately lead to the translation or actuation of the second brake pad assembly 26 from the second retracted position towards the second extended position as previously discussed.

The first and second brake pad assemblies 24, 26 may translate from their respective extended positions to their retracted positions during brake release. The first and second brake pad assemblies 24, 26 may be released and may translate towards their initial retraced positions by reducing the input force applied to the operating shaft 50 by the actuator 40. This reduction in input force may reduce the clamping force applied by the first and second brake pad assemblies 24, 26 to the rotor 28. The reduction in the clamping force may be the result of a partial or complete release of a vehicle brake pedal by the operator.

An adjuster mechanism 120 may be configured to adjust the first extended position of the first brake pad assembly 24 and/or the second extended position of the second brake pad assembly 26 to compensate for wear of the friction material 102 during operation. The adjuster mechanism 120 may be disposed proximate the piston housing 110 and the piston assembly 60. In addition, the adjuster mechanism 120 may be disposed proximate and may be operatively connected to the operating shaft 50 via a drive pin 130, which may have a generally spherical or ball-shaped end. The adjuster mechanism 120 may include a return spring 122, an adjuster shaft 124, a gear assembly 126, and a wear adjuster 128.

The return spring 122 may be disposed proximate and may extend around the adjuster shaft 124. The return spring 122 may exert a return force that may bias the piston assembly 60 and the operating shaft 50 towards a retracted position when the actuator 40 is released. The return force may assist in returning the first and second brake pad assemblies 24, 26 towards their respective retracted positions.

The adjuster mechanism 120 may adjust a length of the piston assembly 60 to maintain an actuation distance or running clearance between the first and/or second brake pad assemblies 24, 26 and the rotor 28. The actuation distance of the first brake pad assembly 24 may correspond to the first running clearance 92 between the first brake pad assembly 24 and the first side 32 of the rotor 28. The actuation distance of the second brake pad assembly 24 may correspond to the second running clearance 94 between the second brake pad assembly 26 and the second side 34 of the rotor 28. The actuation distance or running clearances 92, 94 may increase as the friction material 102 and/or rotor 28 wears during operation. The adjuster mechanism 120 may attempt to adjust the running clearance to be within a predetermined tolerance. The adjuster mechanism 120 may attempt to adjust an overall length of the piston assembly 60 when the first brake pad assembly 24 is in the first extended position or moves to the first extended position and/or the second brake pad assembly 26 is in the second extended position or moves to the second extended position.

There may be relative motion between the piston housing 110 and the piston assembly 60 during a wear adjustment. For example, the piston housing 110 may remain stationary relative to the housing assembly 20 while the piston assembly 60 may extend or retract relative to the housing assembly 20.

As the actuating lever 42 of the actuator 40 moves forward, the operating shaft 50 may rotate. This motion of the actuating lever 42 of the actuator 40 and/or operating shaft 50 may be referred to as stroke. The stroke of the actuating lever 42 of the actuator 40 or the operating shaft 50 may vary in response to the current wear state of the first and second brake pad assemblies 24, 26. For example, as the friction material 102 and/or the rotor 28 wears, the first and second running clearances 92, 94 may increase. The increase in the first and second running clearances 92, 94 may increase the angular rotation distance or the stroke of the operating shaft 50 to engage the first and second brake pad assemblies 24, 26 with the rotor 28.

As the operating shaft 50 rotates, the piston assembly 60 may translate the first brake pad assembly 24 towards the first side 32 of the rotor 28. The drive pin 130, which may be drivably connected to the adjuster mechanism 120, may begin to contact a drive mechanism disposed proximate an end of the adjuster shaft 124. As the operating shaft 50 further rotates, the drive pin 130 may begin to rotate the adjuster shaft 124.

The adjuster mechanism 120 may be operatively connected to the wear adjuster 128 by an intermediate gear 140 that may be configured to rotate the wear adjuster 128. As the tappet 118 rotates, the wear adjuster 128 may rotate as the length of the piston assembly 60 is extended or retracted.

As the tappet 118 is rotated, the piston 112 may wind out from piston housing 110, thus lengthening the piston assembly and adjusting the at least one extended position. As the piston 112 is wound out of the piston housing 110, the piston head 114 may engage the backing plate 100 of the first brake pad assembly 24. The rotation of the operating shaft 50 may result in the translation of the first brake pad assembly 24 from the first retracted position towards the first extended position in which the first brake pad assembly 24 may engage the first side 32 of the rotor 28.

In response to the first and second brake pad assemblies 24, 26 contacting the rotor 28, the resulting clamping force may increase the thread friction between the tappet 118 and piston 112. This increase in the thread friction may increase the torque required to turn the tappet 118, which may inhibit the piston 112 and tappet 118 from rotating relative to each other. The increased torque required to turn the tappet 118 may cause a clutch pack within the gear assembly 126 to slip, preventing further adjustment of the length of the piston assembly 60. The adjuster mechanism 120 may then be inhibited from winding back during the return stroke of the operating shaft 50 to its initial position. The adjuster shaft 124 may remain in constant meshing engagement with the tappet 118 and the tappet 118 may remain in constant mesh with the wear adjuster 128.

A wear sensor arm 142 may be in threaded engagement with the wear adjuster 128. The wear sensor arm 142 may be configured to traverse threads disposed on the outside of the wear adjuster 128 as the adjuster mechanism 120 rotates and adjusts the extended positions of the first and second brake pad assemblies 24, 26. The wear adjuster 128 may rotate in response to rotation of the tappet 118 during wear adjustment, thus resulting in the wear sensor arm 142 traversing the threads.

As the wear adjuster 128 rotates, the wear sensor arm 142 may travel along the length of the wear adjuster 128. The amount of travel by the wear sensor arm 142 may be indicative of the total amount of adjustment or change in the extended position of at least the first brake pad assembly 24 made by the adjuster mechanism 120.

The wear sensor arm 142 may contact a sensor assembly 150 via a plunger 154. The wear sensor arm 142 may be prevented from rotating within the carrier 30 or housing assembly 20 as adjustment of the brake mechanism occurs.

The first or second running clearances 92, 94 may be adjusted to be within an predetermined operating margin to assure effective operation of the brake assembly 10. When the first and second running clearances 92, 94 are within a predetermined operating margin, a predetermined stroke or angular rotation of the operating shaft 50 may help provide effective engagement of the first and second brake pad assemblies 24, 26 with the rotor 28. Should the first or second running clearances 92, 94 not be within the predetermined running clearance, the stroke of the actuating lever 42 or operating shaft 50 may not be within a predetermined operating margin, which may affect brake performance.

The sensor assembly 150 may be provided with a plurality of sensors that may help monitor operation the brake assembly 10, such as operation of the adjuster mechanism 120 and/or wear of the first and second brake pad assemblies 24, 26 and the rotor 28. Referring to FIG. 3, the sensor assembly 150 may include a first sensor 152, a second sensor 156, and a third sensor 170. The first sensor 152, second sensor 156, and/or third sensor 170 or combinations thereof may be disposed in a single housing of the sensor assembly 150.

A first sensor 152 may be disposed within the housing assembly 20 and may be disposed proximate the adjuster mechanism 120. The first sensor 152 may include a plunger 154 that may extend from a first end of the sensor assembly 150. The first sensor 152 may detect or provide data or a first signal indicative of an amount of wear of the first and second brake pad assemblies 24, 26 and/or the rotor 28 by monitoring a change in the first extended position of the first brake pad assembly 24 and/or a change in the second extended position of the second brake pad assembly 26. The first sensor 152 may detect a change in the first and/or second extended positions by monitoring or providing information indicative of the total amount of adjustment made by the adjuster mechanism 120 via the wear sensor arm 142 as the first and second brake pad assemblies 24, 26 move from their retracted positions towards their extended positions. For example, the adjuster mechanism 120 may adjust the first extended position of the first brake pad assembly 24 in response to wear of the friction material 102 of the first brake pad assembly 24, which may result in movement of a change in the position of the wear sensor arm 142 along the wear adjuster 128 and may indirectly adjust the second extended position of the second brake pad assembly 26. The position of the wear sensor arm 142 may be indicative of the wear of the wear of the friction material 102 of the first brake pad assembly 24 and/or the wear of the friction material 102 of the second brake pad assembly 26.

The change in the extended positions may correspond to a change in the first and second running clearances 92, 94 between the brake pad assemblies 24, 26 and the rotor 28. As such, the first sensor 152 may provide a first signal that may be indicative of the total amount of change or adjustment of the extended position of the first brake pad assembly 24, which may correspond to the total amount of wear of the first and second brake pad assemblies 24, 26 and/or the rotor 28. This information may permit a brake monitoring system to make adjustments as various components wear. In at least one embodiment, the first sensor 152 may be configured as a linear potentiometer or the like.

The brake monitoring system may include a controller that may communicate with the sensor assembly 150. In at least one embodiment, the brake monitoring system may communicate with or may be an electronic braking system (EBS), anti-lock braking system (ABS), or an overall vehicle telematics system. The brake monitoring system may receive brake wear information and may perform adaptive brake utilization to balance the wear state of the brake pad assemblies.

The brake monitoring system may receive the first signal and calculate or determine the change in the first extended position that may occur during a brake cycle and may compare the change in the first extended position to a first threshold. The first threshold or first threshold value may represent or be indicative of an amount of friction material wear at which inspection and/or replacement of first brake pad assembly 24 and/or the second brake pad assembly 26 may be desired. The first threshold may be a predetermined value that may be based on vehicle development testing. An audible, visual, or tactile warning or warning that is combinations thereof may be provided to a vehicle operator when the change in the first extended position exceeds the first threshold. A warning may not be provided to a vehicle operator when the change in the first extended position does not exceed the first threshold.

The brake monitoring system may receive information indicative of the wear state of the second brake pad assembly 26 so that wear of the friction material 102 of the first and second brake pad assemblies 24, 26 may be compared. The second sensor 156 may provide a second signal to the brake monitoring system indicative of a position of slide pin assembly 80, which may be used to determine a change in the second extended position of the second brake pad assembly 26. For example, the second sensor 156 may detect the position of the slide pin 82 of the slide pin assembly 80 relative to the housing assembly 20 and the caliper bridge 22 during and/or after actuation of the first and second brake pad assemblies 24, 26.

The second sensor 156 may be disposed within the housing assembly 20 and may be disposed proximate the slide pin assembly 80. The housing assembly 20 may be provided with a passageway or opening that may help the second sensor 156 observe or detect a slide pin 82 or 84.

The slide pin 82 may be provided with an indicator 160. The indicator 160 may be disposed on an outer surface of the slide pin 82. The second sensor 156 may detect the position of the indicator 160 or may provide a second signal indicative of the position of the indicator 160. The position of the indicator 160 may be indicative of the wear of the second brake pad assembly 26 or the wear of the friction material 102 of the second brake pad assembly 26. For example, the caliper bridge 22 and the second brake pad assembly 26 may move relative to the slide pin assembly 80 as the second brake pad assembly 26 is actuated from the second retracted position to the second extended position. The brake monitoring system may receive the second signal and calculate or determine the change in the second extended position that may occur during a brake cycle and may compare the change in the second extended position to a second threshold or switch trigger point. The second threshold or second threshold value may represent or may be indicative of an amount of friction material wear at which inspection and/or replacement of second brake pad assembly 26 may be desired. The second threshold may be a predetermined value that may be based on vehicle development testing.

Figure 4A:
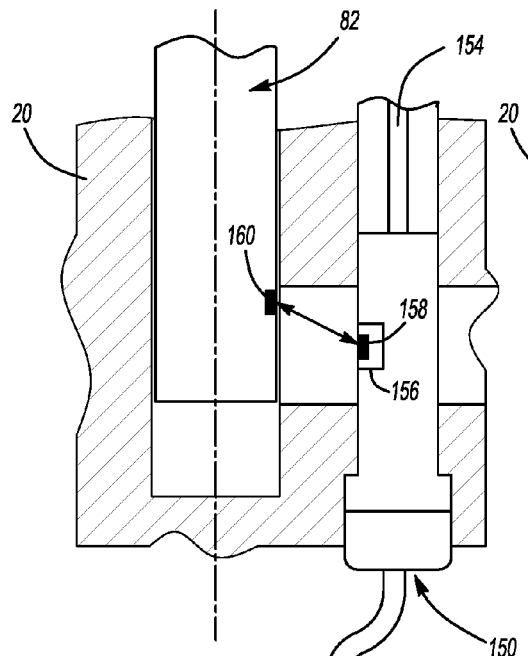
FIGS. 4a and 4b are partial section views of a portion of the brake assembly including an embodiment of a slide pin assembly and a sensor assembly.
Figure 4B:
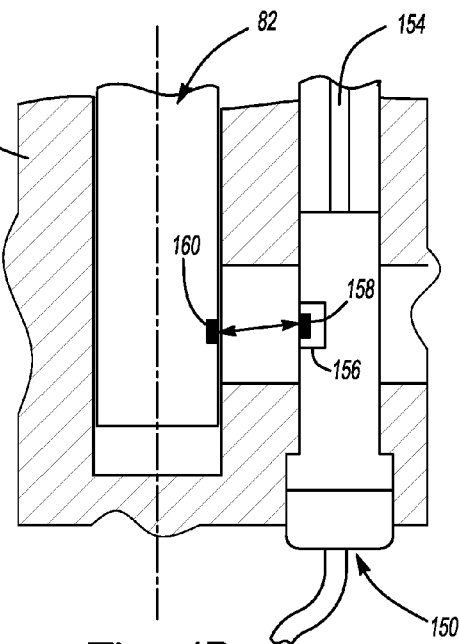

Referring to FIGS. 4a, 4b, 5a, and 5b, the indicator 160 may have various configurations. In FIGS. 4a and 4b, the indicator 160 may emit a signal that may be detected by the second sensor 156. For example, the indicator 160 may be a magnet or magnetic emitter which may emit a magnetic field that may be detected by a magnetic flux sensor 158 disposed within the second sensor 156. The magnetic flux sensor 158 may detect changes in the magnetic field emitted by the indicator 160 as the slide pin 82 translates from a first position as shown in FIG. 4a to a second position as shown in FIG. 4b.

Figure 5A:
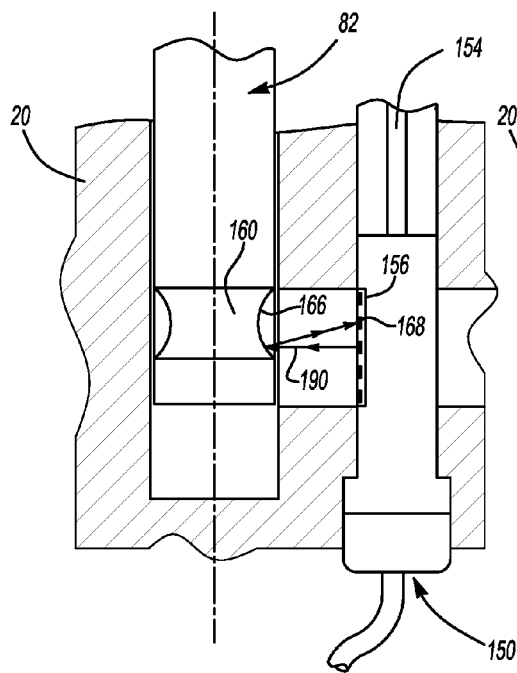
FIGS. 5a and 5b are partial section views of a portion of the brake assembly including another embodiment of a slide pin assembly and a sensor assembly.
Figure 5B:
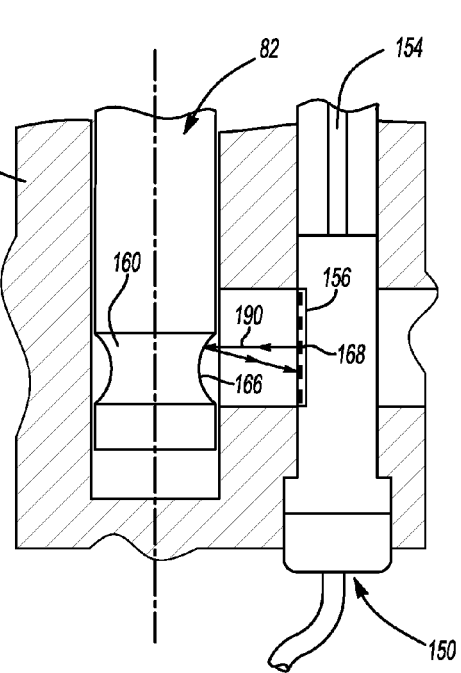

In FIGS. 5a and 5b, the indicator 160 may be a reflective surface. For example, the indicator 160 may be a reflective concave surface 166. The indicator 160 may be configured to direct or reflect an electromagnetic waveform 190 provided by the second sensor 156 towards a photo detector array or light sensor 168 that may be provided with the second sensor 156 as the slide pin 82 translates from a first position as shown in FIG. 5a to a second position as shown in FIG. 5b. The electromagnetic waveform may be a laser, a light, or other electromagnetic radiation known to those skilled in the art. The reflected electromagnetic waveform 190 may be received by the photo detector array or light sensor 168 and may be used to determine the position of the indicator 160 of slide pin assembly 80. The second sensor 156 may provide the second signal indicative of the position of the slide pin 82 relative to the second sensor 156 or the housing assembly 20 and the caliper bridge 22 to the brake monitoring system. The position of the slide pin 82 may indicate a change in the second extended position of the second brake pad assembly 26 to the brake monitoring system indicative of a change in the second extended position of the second brake pad assembly 26.

An audible, visual, or tactile warning or warning that is combinations thereof may be provided to a vehicle operator when the change in the second extended position exceeds the second threshold. A warning may not be provided to a vehicle operator when the change in the second extended position does not exceed the second threshold. The second threshold may be less than the first threshold since the friction material 102 of the first brake pad assembly 24 may wear faster than the friction material 102 of the second brake pad assembly 26.

The brake monitoring system may be configured to correlate the amount of brake pedal depression to the total angular rotation of the operating shaft 50. The correlation may be such that the greater the brake pedal depression by the operator, the greater the expected angular rotation of the operating shaft 50, and the greater the clamping force applied to the rotor 28 by the first and second brake pad assemblies 24, 26.

As the brake pedal is released by the operator, a decrease in the clamping force applied to the rotor 28 by the first and second brake pad assemblies 24, 26 is expected. The operating shaft 50 may begin to rotate back towards its initial position. Upon complete release of the brake pedal by the operator, the operating shaft 50 may rotate back an amount proportional to the angular rotation during the application of the first and second brake pad assemblies 24, 26. The total amount of angular rotation of the operating shaft 50 may correspond to a total amount of friction material 102 left on the first and second brake pad assemblies 24, 26.

Figures 6A, 6B:
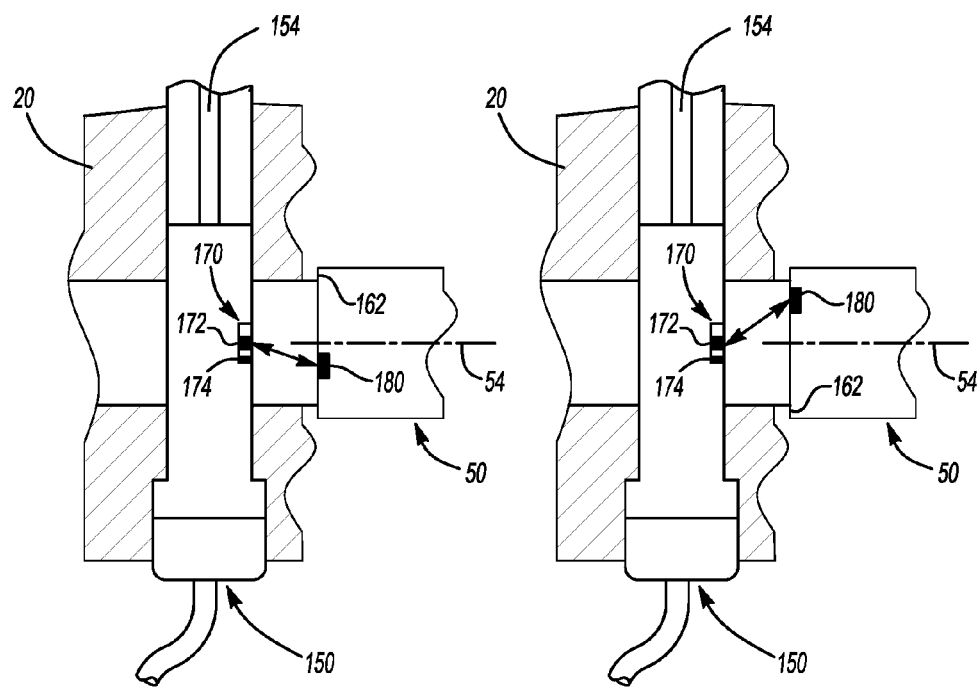
FIGS. 6a and 6b are partial section views of a portion of the brake assembly including an operating shaft and a sensor assembly.

The third sensor 170 may detect the position of the operating shaft 50 via a position feature 180. For example, the third sensor 170 may detect the position of the operating shaft 50 before, during, or after rotation from a first position as shown in FIG. 6a to a second position as shown in FIG. 6b. The position feature 180 may be disposed on an exterior surface of the operating shaft 50 or may be disposed proximate an end surface 162 of the operating shaft 50. The end surface 162 may face toward the sensor assembly 150 and toward the slide pin 82. The position feature 180 may be spaced apart from the operating shaft axis 54. The third sensor 170 may provide a third signal indicative of the position of the position feature 180 of the operating shaft 50. The position of the position feature 180 may be indicative of the angular position of the operating shaft 50. For example, the actuator 40 may rotate the operating shaft 50 and its position feature 180 about the operating shaft axis 54.

Angular rotation of the operating shaft 50 and its position feature 180 may be indicative of the stroke of the operating shaft 50 when the first brake pad assembly 24 is actuated from the first retracted position to the first extended position and may be used to determine whether the adjuster mechanism 120 is functioning properly. The brake monitoring system may receive the third signal and calculate or determine the angular rotation of the operating shaft 50 that may occur during a brake cycle and may compare the angular rotation to a third threshold. The third threshold or third threshold value may represent or be indicative of an expected amount of rotation of the operating shaft 50 when the adjuster mechanism 120 is functioning properly. The third threshold may be a predetermined value that may be based on vehicle development testing. An audible, visual, or tactile warning or warning that is combinations thereof may be provided to a vehicle operator when the angular rotation of the operating shaft 50 exceeds the third threshold. The angular rotation of the operating shaft 50 may exceed the third threshold when the friction material 102 of the first brake pad assembly 24 has worn with respect to the first running clearance 92 and the adjuster mechanism 120 has not adjusted or has not properly adjusted the first extended position of the first brake pad assembly 24. A warning may not be provided to a vehicle operator when the angular rotation of the operating shaft 50 does not exceed the third threshold.

The third sensor 170 may have any suitable configuration. For example, the third sensor 170 may monitor rotation of the operating shaft 50 in a non-contacting or contacting sensor arrangement. As shown in FIGS. 6a and 6b, the second sensor 156 may be provided in a non-contacting sensor arrangement configured as a magnetic field sensor arrangement. In such an arrangement, the position feature 180 may be configured as a magnet and the third sensor 170 may include a detector 172. The detector 172 may detect a magnetic field emitted from the position feature 180 that may be disposed on the operating shaft 50. The strength of the magnetic field may be proportional to the distance between the detector 172 and the position feature 180. As such, the strength of the magnetic field that is detected by the detector 172 may decrease as the angular rotation of the operating shaft 50 increases.

The third sensor 170 may be provided in a non-contacting sensor arrangement configured as an optical sensor arrangement. In such an arrangement, the position feature 180 may include one or more markings or tinted or shaded sections, generically referred to as shaded sections 200 or shading.

Figures 7A, 7B, 7C:
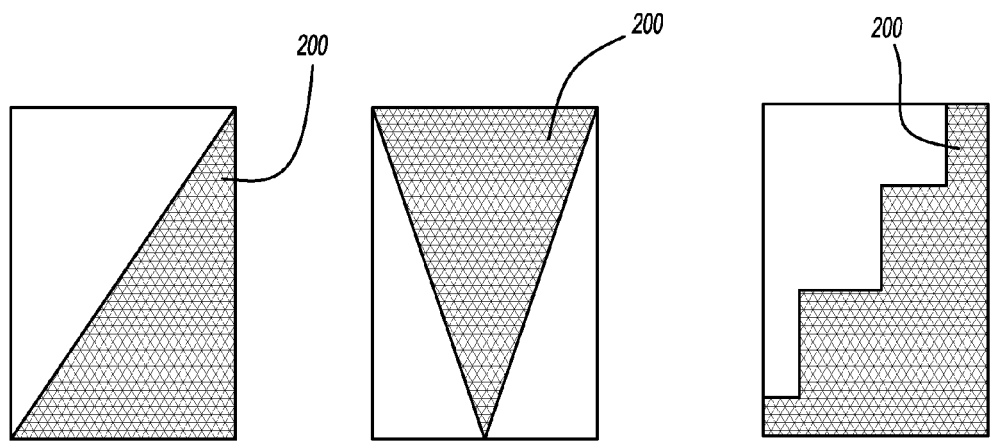
FIGS. 7a-7c show exemplary embodiments of a position indicator that may be provided with the operating shaft.

The shaded sections or markings may be disposed on or integrated with the operating shaft 50 in any suitable manner, such as by printing or with an adhesive. The position feature 180 may be disposed proximate or on the end surface 162 or a curved side surface of the operating shaft 50 that may be radially disposed with respect to the operating shaft axis 54. The shaded sections or markings may be adapted to at least partially reflect transmission of a signal from a transmitter 174 of the third sensor 170 so that is may be received by a detector 172 of the third sensor 170. The transmitter 174 may output a signal or electromagnetic radiation, such as light or a laser beam that may or may not be in the visible light spectrum that may be reflected off of the position feature 180. The reflected signal may be detected by the detector 172 and the reflected signal strength may vary as the operating shaft 50 rotates about the operating shaft axis 54. Examples of position features with shaded sections 200 that may be provided with the operating shaft 50 are shown in FIGS. 7a through 7c.

The third sensor 170 may be provided in a contacting sensor arrangement. In such an arrangement, the third sensor 170 may physically detect the position or stroke of the actuating lever 42 or the operating shaft 50, such as via a mechanical connection or linkage. As shown in FIG. 3, an articulating arm 164 may extend from the third sensor 170 to the position feature 180. As such, the articulating arm 164 may contact and/or engage the position feature 180 such that the third sensor 170 may detect angular rotation of the operating shaft 50 and the associated position feature 180. As the articulating arm 164 moves in response to the motion of the position feature 180, the position of the operating shaft 50 may be detected and may be output to the brake monitoring system. The brake monitoring system may then determine the angular rotation or stroke of the operating shaft 50 based on the position of the operating shaft 50.

The sensor assembly 150 may be configured to operate in two distinct modes: a wear sensing mode and a stroke sensing mode. The modes may operate concurrently or sequentially. The brake monitoring system may operate the sensor assembly 150 in a wear sensing mode using the first sensor 152 and/or the second sensor 156. Such a mode may be activated in response to the start of an ignition cycle or for a predetermined period of time after power is delivered to the brake monitoring system and/or sensor assembly 150. The brake monitoring system may subsequently operate the sensor assembly 150 in a stroke sensing mode after the predetermined time period has elapsed using the third sensor 170 and remain in the stroke sensing mode until the end of the ignition cycle.

The brake monitoring system may provide information regarding the operating status of the brake assembly 10 an operator of the vehicle via an operator communication device. The operator communication device may be of any suitable type or types, such as a switch, button, sensor, display, touchscreen, speaker, voice command or speech recognition system, or the like. Examples of operating status information, alerts, or warnings will now be described.

A brake overstroke warning may be provided when a brake overstroke condition is detected. The brake overstroke condition may exist when the first signal is less than the first threshold and the third signal is greater than the third threshold. In this situation, the adjuster mechanism 120 has not adjusted or has not properly adjusted the first and/or second extended positions of the first and second brake pad assemblies 24, 26. More specifically, the adjuster mechanism 120 may not have adjusted or may have made a small adjustment to the first extended position when the first signal may be less than the first threshold, but the magnitude of angular rotation of the operating shaft 50 is of a sufficient magnitude that the adjuster mechanism should have adjusted or changed the first extended position since the third signal is greater than the third threshold. The warning may be an audible, visual, or tactile warning or combinations thereof.

A brake understroke warning may be provided when a brake understroke condition is detected. The brake understroke condition may exist when the first signal is greater than the first threshold and the third signal is less than the third threshold. In this situation, the adjuster mechanism 120 may have adjusted the first and/or second extended positions of the first and second brake pad assemblies 24, 26 such that the first running clearance 92 and/or the second running clearance 94 is too close to the rotor 28 or below a desired running clearance amount. For example, the adjuster mechanism 120 may have adjusted the first extended position since the first signal exceeds the first threshold, but the magnitude of angular rotation of the operating shaft 50 is less than that expected for a desired running clearance. The brake understroke condition may also indicate that the piston assembly 60 is not properly returning the first and second brake pad assemblies 24, 26 to their respective retracted positions. The warning may be an audible, visual, or tactile warning or combinations thereof.

An unbalanced brake pad wear warning may be provided when an unbalanced brake pad wear condition is detected. The unbalanced brake pad wear condition may exist when the first signal is less than the first threshold and the second signal is greater than the second threshold. In this situation, the friction material 102 of the second brake pad assembly 26 may have worn prior to the friction material 102 of the first brake pad assembly 24 by an undesirable amount. For example, the adjuster mechanism 120 may have adjusted the second extended position by a sufficiently greater amount than the first extended position. The unbalanced brake pad wear condition may also exist when the first signal is greater than the first threshold and the second signal is less than the second threshold. In this situation, the friction material 102 of the first brake pad assembly 24 may have worn prior to the friction material 102 of the second brake pad assembly 26 by an undesirable amount. For example, the adjuster mechanism 120 may have adjusted the first extended position by a sufficiently greater amount than the second extended position. The unbalanced brake pad wear warning may be an audible, visual, or tactile warning or combinations thereof.

A balanced wear condition may exist when wear of the first brake pad assembly may be substantially similar to wear of the second brake pad assembly. For example, a balanced wear condition may exist when the first signal is less than the first threshold and the second signal is less than the second threshold. A warning may not be provided when a balanced wear condition exists and/or a balanced wear condition indicator or message may be provided to a vehicle operator.

An adjuster mechanism warning may be provided when the adjuster mechanism 120 is not functioning properly. The adjuster mechanism 120 may not be functioning properly when the first signal is not indicative of a change in the first extended position, the second signal is not indicative of a change in the second extended position, and the third signal exceeds the third threshold (indicative of rotation of the operating shaft 50). As such, the combination of signals may indicate that the extended position of one or more brake pad assemblies should have been adjusted but no such adjustment occurred, which may result in running clearances that may be greater than desired.

A brake system error message may be output by the brake monitoring system based on the stroke of the operating shaft 50. The brake monitoring system may compare the angular rotation of the operating shaft 50 that occurs when the first and second brake pad assemblies 24, 26 are actuated from their retracted positions to their extended positions to the angular rotation of the operating shaft 50 that occurs when the first and second brake pad assemblies 24, 26 are actuated from their extended positions to their retracted positions. If the angular rotation to the extended position is not substantially equal to the angular rotation to the retracted position, then the brake system error message may be output. The brake system error message may indicate that service of the brake assembly may be required. The brake system error message may be audible, visual, tactile, or combinations thereof.

A brake servicing warning may be output by the brake monitoring system when brake pad servicing or replacement may be desired. The brake servicing condition may exist when the first signal is greater than the first threshold and the second signal is greater than the second threshold. In this situation, the friction material 102 of the first brake pad assembly 24 and the second brake pad assembly 26 may have worn by an undesirable amount. The brake servicing warning may be audible, visual, tactile, or combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a housing assembly;
   a piston assembly moveably disposed within the housing assembly;
   an operating shaft that is provided with a position feature and that is disposed proximate the housing assembly, wherein the operating shaft rotates about an operating shaft axis to actuate the piston assembly and translate a brake pad assembly from a retracted position to an extended position;
   an adjuster mechanism that is operatively connected to the piston assembly and is configured to adjust the extended position;
   a slide pin assembly upon which the housing assembly translates; and
   a sensor assembly that is disposed proximate the housing assembly, the sensor assembly having a first sensor that detects a position of the adjuster mechanism, a second sensor that detects a position of the slide pin assembly, and a third sensor that detects rotation of the operating shaft by detecting a position of the position feature, wherein the first sensor, second sensor, and third sensor are disposed in a single housing.

2. The brake assembly of claim 1 wherein the position feature is a magnetic emitter disposed on an end surface of the operating shaft.

3. The brake assembly of claim 2 wherein the sensor assembly is a magnetic flux sensor that detects the magnetic emitter.

4. The brake assembly of claim 3 wherein the magnetic flux sensor is spaced apart from and disposed below the operating shaft axis.

5. The brake assembly of claim 1 wherein the position feature is spaced apart from the operating shaft axis.

6. The brake assembly of claim 1 wherein the sensor assembly provides a signal indicative of an actuation distance of the brake pad assembly from the retracted position to the extended position.

7. A brake assembly comprising:
   a housing assembly provided with a piston assembly;
   an operating shaft that is disposed proximate the housing assembly and that has a position feature, wherein the operating shaft is configured to rotate about an operating shaft axis to actuate the piston assembly and translate a brake pad assembly from a retracted position to an extended position;
   an adjuster mechanism operatively coupled to the piston assembly and configured to change the extended position in response to rotation of the operating shaft;
   a slide pin assembly upon which the housing assembly translates when the piston assembly is actuated; and
   a sensor assembly disposed proximate the housing assembly, the sensor assembly having a first sensor that detects a position of the adjuster mechanism, a second sensor that detects a position of the slide pin assembly, and a third sensor that detects a position of the position feature and a change in the extended position, wherein the first, second and third sensors are received in a housing and the third sensor is disposed in the housing opposite the first sensor.

8. The brake assembly of claim 7 wherein the sensor assembly provides a third signal indicative of rotation of the operating shaft based on the position of the position feature.

9. The brake assembly of claim 8 wherein a warning is provided when rotation of the operating shaft exceeds a third threshold and the change in the extended position is less than a first threshold.

10. The brake assembly of claim 7 wherein the position feature is disposed proximate an end surface of the operating shaft and is spaced apart from the operating shaft axis.

11. The brake assembly of claim 7 wherein the sensor assembly is spaced apart from the operating shaft and disposed below the operating shaft axis.

* * * * *